J. B. STEARNS.
Improvement in Arrangement of Circuits and Apparatus for Duplex Telegraphing.
No. 132,930.                                                Patented Nov. 12, 1872.
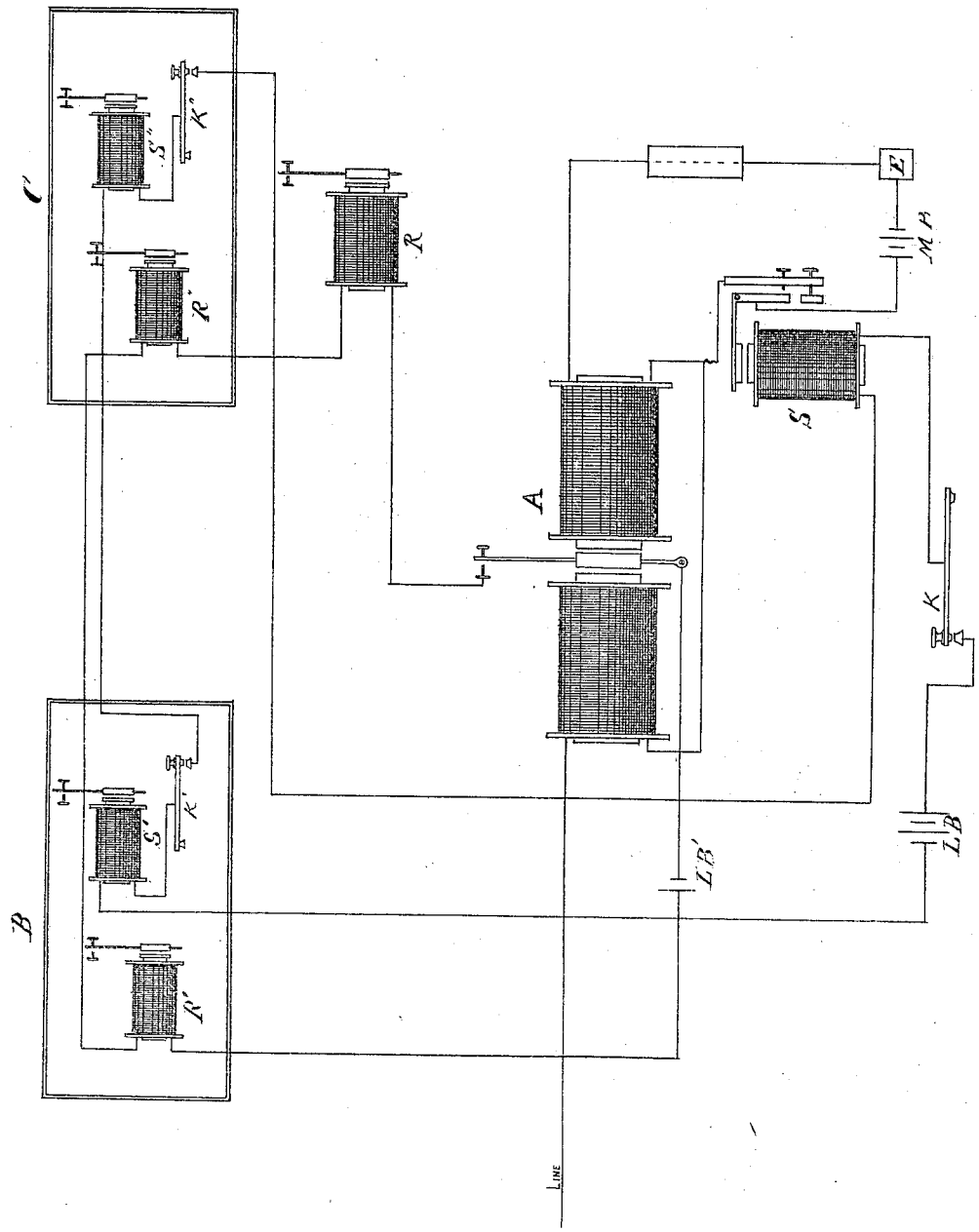

UNITED STATES PATENT OFFICE.

JOSEPH B. STEARNS, OF BOSTON, MASSACHUSETTS.

IMPROVEMENT IN ARRANGEMENTS OF CIRCUITS AND APPARATUS FOR DUPLEX TELEGRAPHING.

Specification forming part of Letters Patent No. 132,930, dated November 12, 1872.

CASE A.

*To all whom it may concern:*

Be it known that I, JOSEPH B. STEARNS, of Boston, in the county of Suffolk, State of Massachusetts, have invented an Improvement in Telegraph Apparatus, of which the following is a specification:

This invention consists in the arrangement of a series of branch or secondary stations with double transmitting apparatus at the main station in such a manner that each branch station can transmit to the line with the same facility as the main station, and receive simultaneously with it.

The accompanying drawing making part of this specification represents the arrangement of circuits connecting the main station with the branch or secondary stations.

A is the receiving instrument at the main station; M B, the main battery; S, the electro-magnetic key or sending-sounder; L B, the local battery; and K, the key operating the same. R is the receiving-sounder, operated by the local battery L B'; B and C are branch offices, in which are placed receiving-sounders R' R'' in the same circuit L B' as the receiving-magnet R at the main station, and sending-sounders S' S'', and lever-keys K' K'' in the same circuit L B as the key K and sounder S at the main station.

The mode of operation is as follows: All the keys and all the sending-sounders, both of the main and of the branch or secondary stations, being in the same circuit L B, the movement of the lever-key at any station, main or secondary, causes a signal to be transmitted to the line, operating simultaneously all the sending-sounders, so that all the stations know when any one of them is transmitting. All the receiving instruments being in the same circuit, L B', when a signal is received at the main station, it is received simultaneously at all the secondary stations. The receiving instrument at the main station both transmits and receives at the same time; two sounders are therefore necessary at each secondary or branch station—one for the signals transmitted, the other for those received.

What I claim as my invention, and desire to secure by Letters Patent of the United States, is—

In double-transmitting apparatus, the extension of the local sending-circuit and local receiving-circuit from the main station to branch or secondary stations, in the manner and for the purpose set forth.

JOSEPH B. STEARNS.

Witnesses:
 JOHN P. LORD,
 A. L. HAYES.